United States Patent
Iwamoto

(10) Patent No.: US 8,411,997 B2
(45) Date of Patent: Apr. 2, 2013

(54) IMAGE CAPTURE DEVICE AND PROGRAM STORAGE MEDIUM

(75) Inventor: Kenji Iwamoto, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 156 days.

(21) Appl. No.: 12/361,701

(22) Filed: Jan. 29, 2009

(65) Prior Publication Data

US 2009/0196461 A1 Aug. 6, 2009

(30) Foreign Application Priority Data

Jan. 31, 2008 (JP) ................. 2008-022156

(51) Int. Cl.
*G06K 9/36* (2006.01)

(52) U.S. Cl. ........ 382/289; 382/118; 382/190; 382/154; 382/171; 382/173; 382/257; 348/222.1; 348/239

(58) Field of Classification Search .......... 382/289, 382/118, 190, 154, 171, 173, 257; 348/239, 348/222.1

See application file for complete search history.

(56) References Cited

U.S. PATENT DOCUMENTS

| | | | |
|---|---|---|---|
| 6,743,633 B1 | 6/2004 | Hunter | |
| 2006/0285750 A1* | 12/2006 | Okada et al. | 382/190 |
| 2007/0013791 A1* | 1/2007 | Kinoshita et al. | 348/239 |
| 2007/0122010 A1* | 5/2007 | Kitamura et al. | 382/118 |
| 2008/0013799 A1* | 1/2008 | Steinberg et al. | 382/118 |

FOREIGN PATENT DOCUMENTS

| | | |
|---|---|---|
| JP | 2001-76156 A | 3/2001 |
| JP | 2005-164669 A | 6/2005 |
| JP | 2006-202047 A | 8/2006 |
| JP | 2007-42072 A | 2/2007 |
| JP | 2007-235399 A | 9/2007 |
| JP | 2008-139319 A | 6/2008 |

OTHER PUBLICATIONS

Japanese Office Action dated Jan. 22, 2010 and English translation thereof issued in a counterpart Japanese Application No. 2008-022156.
Japanese Office Action dated Nov. 22, 2011 (and English translation thereof) in counterpart Japanese Application No. 2010-114481.
Japanese Office Action dated Jan. 24, 2012 (and English translation thereof) in counterpart Japanese Application No. 2010-055209.
Japanese Office Action dated Jul. 31, 2012 and English translation thereof in counterpart Japanese Application No. 2010-055209.

* cited by examiner

*Primary Examiner* — Mike Rahmjoo
(74) *Attorney, Agent, or Firm* — Holtz, Holtz, Goodman & Chick, P.C.

(57) ABSTRACT

An image capture device includes a capture unit configured to capture an image of an object, an object detection unit configured to detect the object in the image captured by the capture unit, an angle detection unit configured to detect an angle of the object detected by the object detection unit, and a control unit configured to perform a predetermined control operation for the image capture device based on the angle of the object detected by the angle detection unit.

15 Claims, 8 Drawing Sheets

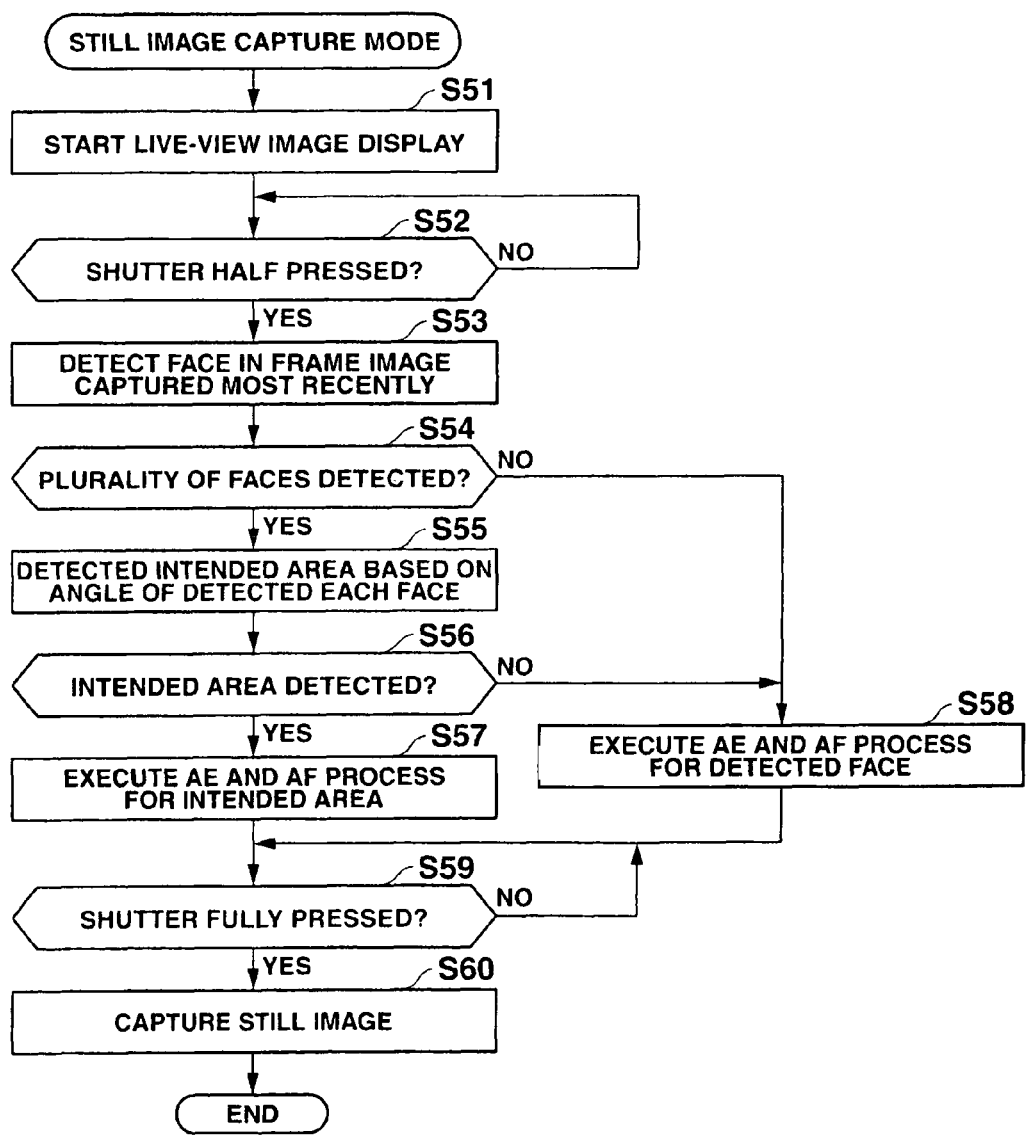

IMAGE CAPTURE DEVICE AND PROGRAM STORAGE MEDIUM

CROSS-REFERENCE TO RELATED APPLICATIONS

This application is based upon and claims the benefit of priority from prior Japanese Patent Application No. 2008-022156, filed Jan. 31, 2008, the entire contents of which are incorporated herein by reference.

BACKGROUND OF THE INVENTION

1. Field of the Invention

The present invention relates to an image capture device and a program storage medium.

2. Description of the Related Art

There is a prior art in which the position of an object to be image-captured is sequentially detected (Jpn. Pat. Appln. KOKAI Publication No. 2001-76156). This patent document searches from a search area of a present frame for a small image region which is similar to a template (an image area including an object to be tracked) extracted from a previous frame. The small image region having the highest similarity is detected and it is determined that the object is moved into this small image region. By repeatedly performing the above process, it is detected into which small image region the object is moved. Thus, the object tracking process is performed.

However, this patent document cannot detect the direction to which the object is moved.

BRIEF SUMMARY OF THE INVENTION

Accordingly, it is an object of the invention to provide an image capture device and a program storage medium capable of detecting the direction to which the object is moved and controlling the image capture taking the moving direction of the object into consideration.

The present invention is directed to method and apparatus that substantially obviates one or more of the problems due to limitations and disadvantages of the related art.

According to an embodiment of the present invention, an image capture device comprises a capture unit configured to capture an image of an object; an object detection unit configured to detect the object in the image captured by the capture unit; an angle detection unit configured to detect an angle of the object detected by the object detection unit; and a control unit configured to perform a predetermined control operation for the image capture device based on the angle of the object detected by the angle detection unit.

According to another embodiment of the present invention, a computer readable storage medium having a computer program stored thereon that is executed by a computer of an image capture apparatus to control the image capture apparatus to perform functions comprises detecting an object in an image captured by the image capture apparatus; detecting an angle of the detected object; and performing a predetermined control operation for the image capture apparatus based on the detected angle of the object.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 7 is a flowchart showing the operation of the digital camera 1 according to a third embodiment.

DETAILED DESCRIPTION OF THE INVENTION

An image capture device according to an embodiment of the invention will be explained in detail below with reference to the accompanying drawings.

First Embodiment

A. Configuration of Digital Camera

Figure 1:
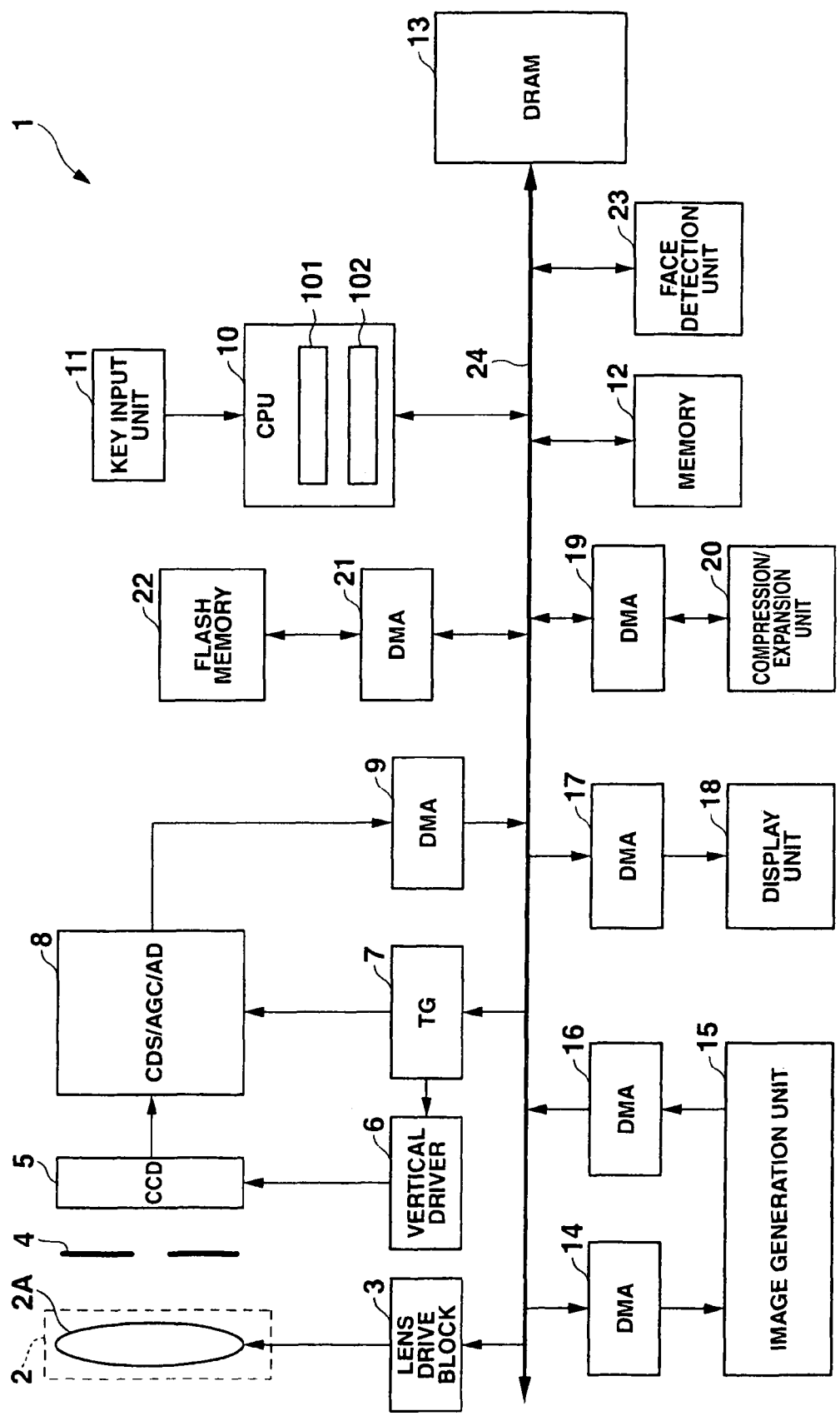
FIG. 1 is a block diagram showing a digital camera as an image capture device according to an embodiment of the invention.

FIG. 1 is a block diagram showing the schematic electrical configuration of the digital camera 1 as an image capture device according to an embodiment of the invention.

The digital camera 1 includes an imaging lens 2, a lens drive block 3, a diaphragm 4, a CCD 5, a vertical driver 6, a timing generator (TG) 7, a unit circuit 8, a direct memory access (DMA) controller (hereinafter referred to as the DMA) 9, a CPU 10, a key input unit 11, a memory 12, a DRAM 13, a DMA 14, a compression/expansion unit 20, a DMA 21, a flash memory 22, a face detection unit 23 and a bus 24.

The imaging lens 2 is configured by a plurality of lenses not shown, and includes at least a focusing lens 2A. The focusing lens 2A is connected with the lens drive block 3. The lens drive block 3 is configured by a focusing motor (not shown) for driving the focusing lens 2A in the direction along the optical axis and a focusing motor driver (not shown) for driving the focusing motor in accordance with a control signal sent from the CPU 10.

The diaphragm 4 interposed between the imaging lens 2 and the CCD 5 includes a drive circuit not shown, which activates the diaphragm 4 in accordance with the control signal sent from the CPU 10.

The diaphragm 4 is defined as a mechanism for controlling the amount of the light incident to the CCD 5.

The exposure is determined by the degree of the opening (aperture) of the diaphragm 4 and the shutter speed.

The CCD 5 is scanned and driven by the vertical driver 6 so that the intensity of the light of each color of RGB of each pixel making up an object image is converted into an electrical signal at regular time intervals, and the electrical signal is output as an image signal to the unit circuit 8. The operation timing of the vertical driver 6 and the unit circuit 8 is controlled by the CPU 10 through the TG 7. The CCD 5 has the function of an electronic shutter, which in turn is controlled through the vertical driver 6, the TG 7 and the CPU 10.

The unit circuit 8 is connected with the TG 7, and configured by a correlated double sampling (CDS) circuit for holding the image signal output of the CCD 5 by correlated double sampling, an automatic gain control (AGC) circuit for automatically controlling the gain of the image signal after the sampling, and an analog-to-digital converter for converting the analog signal after the automatic gain control into a digital signal. The image signal obtained by the CCD 5 is processed in the unit circuit 8 and then stored in a buffer (DRAM 13) in the form of raw data by the DMA 9.

The CPU 10 is a one-chip microcomputer having the function of executing the AF process, the recording process and the display process while at the same time controlling each part of the digital camera 1.

The CPU 10, includes a control unit 101 for limiting the face area detected by the face detection unit 23 based on the angle of the face detected by the face detection unit 23, and an AE processing unit 102 for executing the AE process based on the image data.

The key input unit 11 includes a plurality of operation keys such as a shutter button adapted to be half or fully pressed, a mode switching key, a video recording button, a cross key and a set key, and outputs an operation signal corresponding to the key operation of the user to the CPU 10.

The memory 12 has recorded therein the required data and the control program required by the CPU 10 to control each part of the digital camera 1, and the CPU 10 operates in accordance with this program.

The DRAM 13 is used as a buffer for temporarily storing the image data captured by the CCD 5 on the one hand and as a working memory of the CPU 10 on the other hand.

The DMA 14 reads the raw image data stored in the buffer and outputs it to the image generation unit 15.

The image generation unit 15 executes such processes as pixel interpolation, a gamma correction and white balance on the image data sent from the DMA 14, while at the same time generating the brightness/color difference signal (YUV data). In other words, the image generation unit 15 is a portion where the image is processed.

The DMA 16 causes the buffer to store the image data (YUV data) of the brightness/color difference signal processed in the image generation unit 15.

The DMA 17 outputs the YUV image data in the buffer to the display unit 18.

The display unit 18, including a color LCD and a drive circuit thereof, displays the image of the image data output from the DMA 17.

The DMA 19 outputs the YUV image data stored in the buffer and the compressed image data to the compression/expansion unit 20 on the one hand and causes the buffer to store the image data compressed/decompressed by the compression/expansion unit 20 on the other hand.

The compression/expansion unit 20 compresses/decompresses the image data (according to the JPEG or MPEG scheme, for example).

The DMA 21 reads the compressed image data stored in the buffer and records it in the flash memory 22, or causes the buffer to store the compressed image data recorded in the flash memory 22.

The face detection unit 23 executes the process of detecting the face existing in the image data captured. In this face detection process, both the face area and the angle of the face are detected. This face detection process, though not described in detail as it is well known, is executed in such a manner that the feature data on the face of an ordinary person obtained from all directions (including the eyes, eyebrows, nose, mouth, ears and the contours of the whole face as viewed from all directions) and stored in advance are compared and collated with the image data. An area where the degree to which the face feature data coincide with the image data is not less than a predetermined value is detected as a face, and the angle obtained from the detected fact that the angle of each face feature is coincident to a degree less than the predetermined value is determined as an angle of the detected face.

It should be noted that the angle of the face may be detected from the positional relationships of the eyes, nose and mouth detected based on the respective feature data thereof.

B. Operation of Digital Camera 1

The operation of the digital camera 1 for capturing and recording a moving image will be explained with reference to the flowchart of FIG. 2.

During the live-view display in image capture mode, assume that the user fully depresses the video recording button of the key input unit 11 (i.e., the operation signal corresponding to the depression of the video recording button is sent from the key input unit 11). Then, the CPU 10, determining that the moving image capture operation and the recording process is started, determines whether the image capture timing has arrived or not (step S1). In the case under consideration, the image of the object is captured at the frame rate of 30 fps, and therefore, the image capture timing arrives at intervals of $\frac{1}{30}$ second.

Upon determination in step S1 that the image capture timing is not yet to arrive, the process stays in step S1 until the arrival of the image capture timing, and with the arrival of the image capture timing, the CPU 10 executes the image capture operation (step S2). This image capture operation is executed based on the gain, the aperture and the shutter speed set by the AE process (described later) in step S6. Specifically, the CCD 5 performs the exposure operation with the shutter speed and the aperture set thereby to read the image data accumulated in the CCD 5. In accordance with the gain thus set, the AGC of the unit circuit 8 automatically controls the gain of the frame image that has been read. The frame image of the brightness/color difference signal after automatic gain control generated by the image generation unit 15 is stored in the buffer.

The AE process is not executed in step S6 for the first frame capture (step S2) after starting the moving image capture operation. Thus, the AE process is executed based on the frame image captured most recently for the live-view display before the moving image capture operation. Then, the image capture operation is executed based on the gain, the aperture and the shutter speed set thereby.

Next, the CPU 10 outputs to the face detection unit 23 the frame image captured most recently in step S2 and stored in the buffer, and causes the face detection unit 23 to execute the face detection process on the frame image captured most recently (step S3). The information indicating the face area and the information indicating the angle of the face detected by this face detection process are sent to the CPU 10. This face detection process is executed under control of the control unit 101 of the CPU 10 in step S4 described later. It should be noted that, since the face detection control operation is not performed in step S4 described later, the first face detection after starting the moving image capture operation is executed for the whole area, a predetermined area or an arbitrarily designated area of the frame image.

Then, the control unit 101 of the CPU 10 controls the face detection unit 23 in such a manner as to execute the face detection process with emphasis placed on the angle of the detected face (step S4). The face detection process with emphasis placed on the angle of the detected face is defined as the same process executed only for a predetermined area based on the angle of the detected face. This is by reason of the fact that the person is normally considered to move along the direction in which the face is oriented, and by detecting the face for a predetermined face area expanded along the direction in which the face is positioned, the processing load of the face detection can be reduced while at the same time making it possible to detect the face quickly. Specifically, this control operation makes it possible to quickly track the detected face and thus reduce the processing load of the tracking.

Next, the AE processing unit 102 of the CPU 10 specifies a prediction area based on the angle of the detected face (step S5). This prediction area based on the angle of the detected face is defined as the detected predetermined face area displaced along the direction in which the face is oriented. This is in view of the fact that the person normally moves in the direction along which his/her face is oriented. The AE process is executed with emphasis placed on this specified prediction area.

Figure 3A:
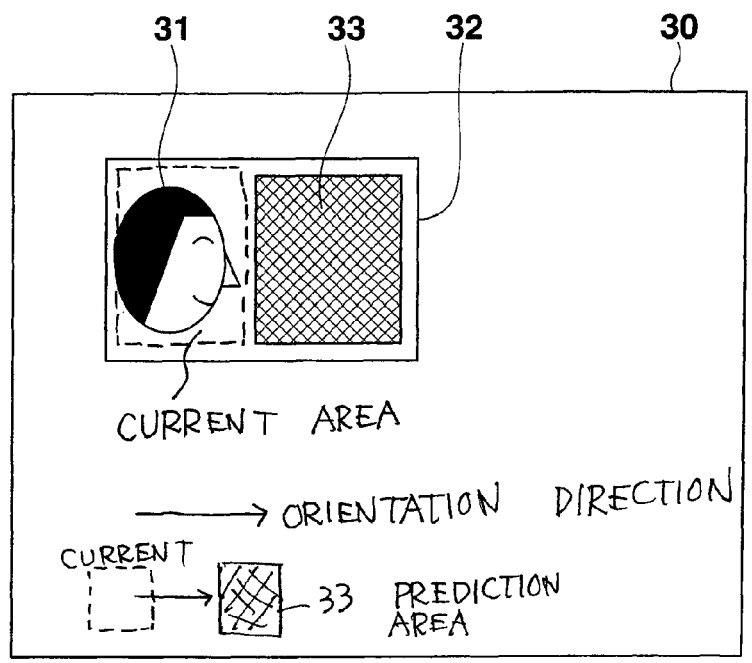
FIG. 3A is a diagram showing an example of the face detected in the frame image, a predetermined area to be processed for face detection based on the angle of the detected face and a prediction area specified based on the angle of the detected face.

FIG. 3A shows an example of the face detected in the frame image, a predetermined area on which the face detection process is executed based on the angle of the detected face and the prediction area specified based on the angle of the detected face.

As seen from FIG. 3A, it is recognized that the frame image 30 contains the face 31 directed rightward, the predetermined area 32 on which the face detection process is executed is elongate along the direction in which the faces 31 is positioned. By setting the predetermined area 32 as the area on which the face detection process is executed, the processing load of the face detection and the tracking processing load of the next sequence can be reduced.

Also, it can be understood from FIG. 3A that the prediction area 33 is displaced as a predetermined area containing the face 31 along the direction in which the face 31 is positioned. The prediction area 33 may have the same size as the detected face or a predetermined size.

Figure 2:
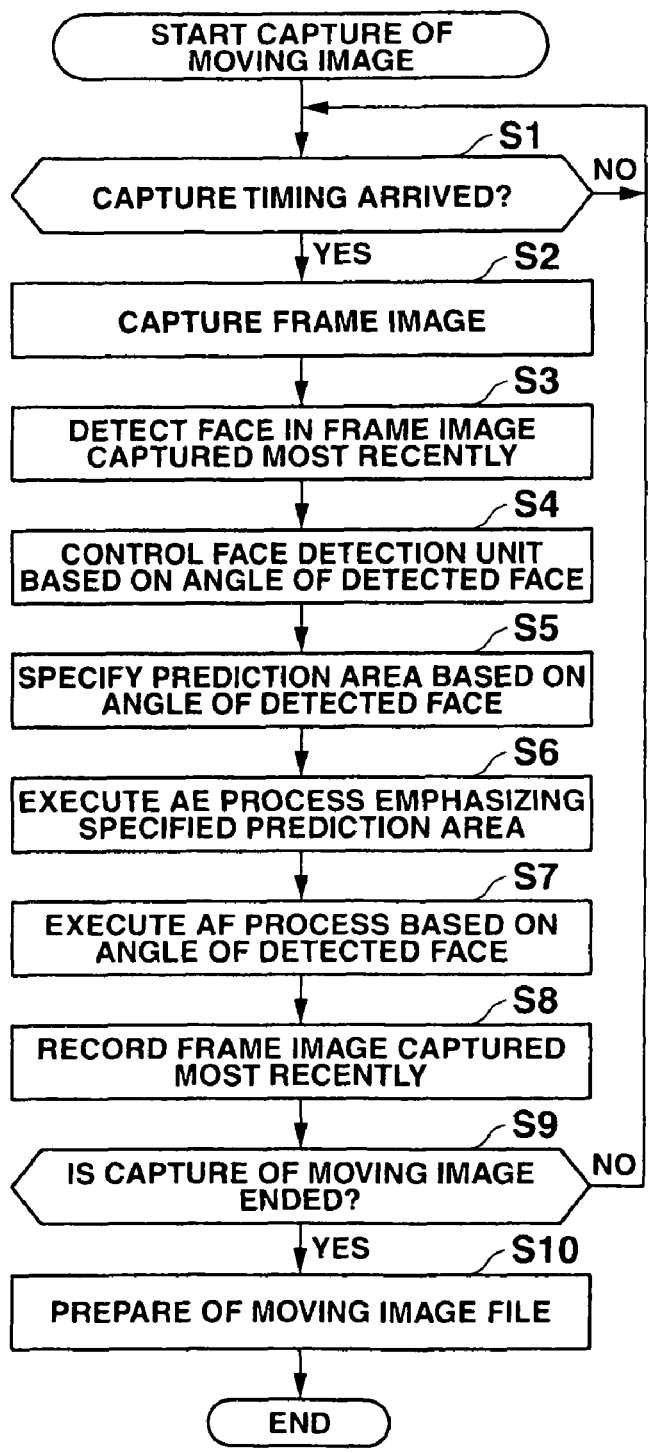
FIG. 2 is a flowchart showing the operation of the digital camera 1 shown in FIG. 1.

Returning to the flowchart of FIG. 2, the AE processing unit 102 of the CPU 10, after the operation in step S5, executes the AE process with emphasis placed on the specified prediction area 33 (step S6).

Specifically, the specified prediction area 33 included in the frame image captured most recently in step S2 and stored in the buffer is set as an optical measurement area, and the AE process is executed based on the brightness signal of the image data of the optical measurement area. This AE process sets the shutter speed, aperture and the gain.

Next, the CPU 10 executes the AF process on the face based on the angle of the detected face (step S7). The AF process based on the angle of the detected face is defined as the process of changing the direction in which the focusing lens 2A is moved for search, based on the angle of the detected face.

Figure 4A:
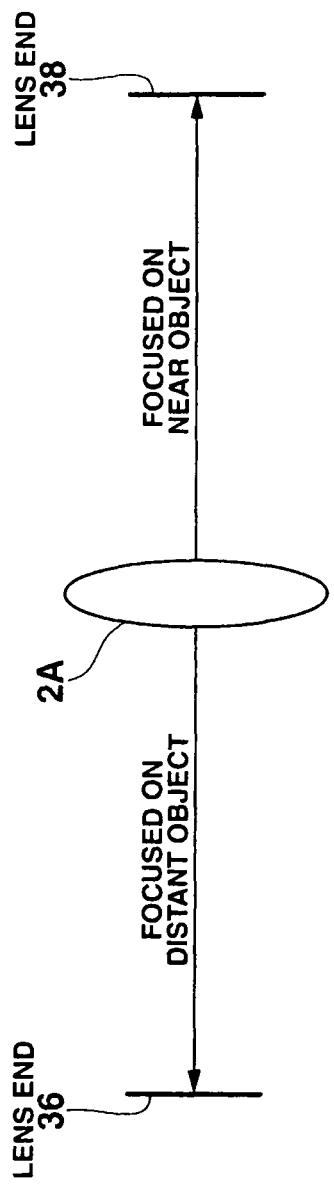
FIG. 4A is a diagram showing the manner in which a focusing lens 2A is moved.

FIG. 4A shows the manner in which the focusing lens 2A is moved. As shown in FIG. 4A, the focusing lens 2A is movable from the most distant lens end 36 to the nearest lens end 38, and the AF process is executed by moving the focusing lens 2A for search between the most distant lens end 36 and the nearest lens end 38. A focused lens position is thus detected based on the high-frequency component of the image data at each lens position, to which the focusing lens 2A is moved. The lens end 38 is the position where the image of a near object is focused, while the lens end 36 is the lens position where the image of a distant object is focused.

In the process, the direction of the search movement of the focusing lens 2A is changed in accordance with the angle of the detected face.

Figure 4C:
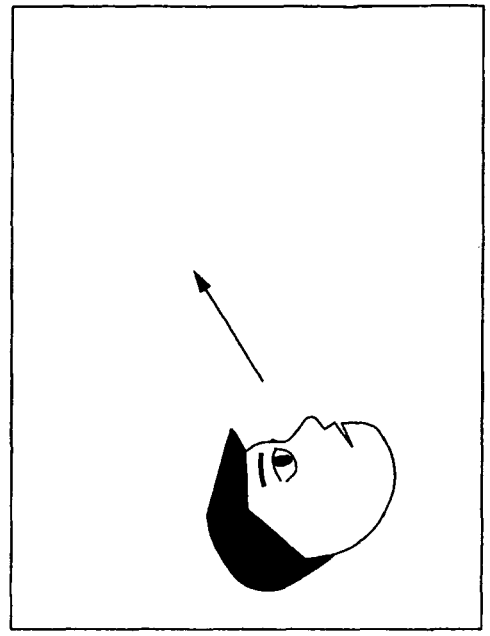
FIGS. 4B and 4C are diagrams showing examples of the angle of the detected face.
Figure 4B:
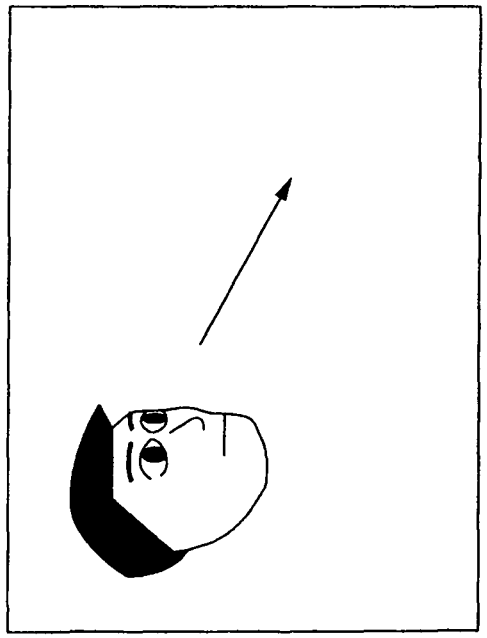

FIG. 4B is a diagram showing an example of the angle of the detected face.

In the case where the detected face is directed to this side at right as shown in FIG. 4B, the face is expected to move toward the digital camera 1, and therefore, the focusing lens 2A is moved for search toward the lens end 38 where the image of a near object is focused to detect the focused lens position.

In the case where the detected face is directed toward the depth at right as shown in FIG. 4C, on the other hand, the face is expected to move away from the digital camera 1, and therefore, the focusing lens 2A is moved for search toward the lens end 36 where the image of a distant object is focused thereby to detect the focused lens position.

Specifically, in the case where the angle of the detected face is directed toward the digital camera 1, the focusing lens 2A is moved for search from the present lens position first toward the lens end 38 where the image of a near object is focused, while in the case where the angle of the detected face is directed away from the digital camera 1, on the other hand, the focusing lens 2A is moved for search from the present lens position first toward the lens end 36 where the image of a distant object is focused.

In the case where the angle of the detected face is directed neither away from nor toward the digital camera 1 (in the case where the face is directed just sideways, for example), then the focusing lens 2A may not be moved (the AF process may not be executed) or may be moved in a narrow range back and forth (in the direction toward the lens end 38 where the image of a near object is focused or the direction toward the lens end 36 where the image of a distant object is focused) from the present lens position thereby to detect the focused lens position. This is by reason of the fact that as long as the distance from the digital camera 1 to the object remains unchanged, the object is in focus or only slightly gone out of focus.

As described above, the AF process can be executed quickly by changing the direction of search movement of the focusing lens 2A in accordance with the angle of the detected face.

Returning to the flowchart of FIG. 2, upon execution of the AF process on the face based on the angle of the detected face, the CPU 10 causes the compression/expansion unit 20 to compress the frame image captured most recently in step S2 add recorded in the buffer, and the compressed frame image is recorded in the flash memory 22 through the DMA 21 (step S8).

Then, the CPU 10 determines whether the moving image capture operation is ended or not (step S9). This determination is made according to whether the operation signal corresponding to the full depression of the shutter button is sent again from the key input unit 11 or not.

Upon determination in step S9 that the moving image capture operation is ended, a moving image file is created based on the recorded frame image (step S10), while in the case where step S9 determines that the moving image capture operation is not ended, on the other hand, the process returns to step S1 and the operation described above is repeated. Specifically, upon determination in step S1 that the image capture timing has arrived, step S2 causes the CCD 5 to perform the exposure operation at the shutter speed and the aperture set by the AE process in step S6, and the frame image accumulated in the CCD 5 is read. At the same time, the AGC of the unit circuit 8 automatically controls the gain of the frame image read from the CCD 5, in accordance with the set gain, and the frame image of the brightness/color difference signal after automatic gain control which is generated by the image generation unit 15 is stored in the buffer.

Figure 3B:
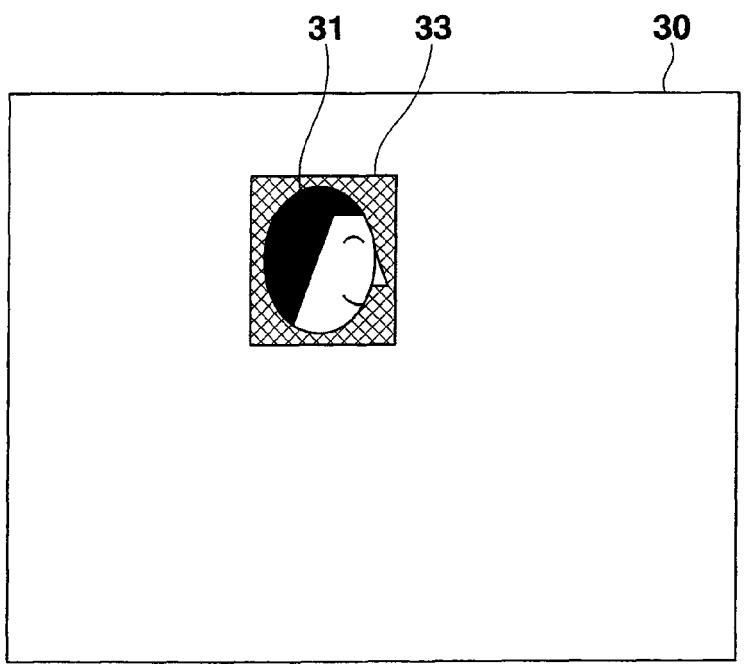
FIG. 3B is a diagram showing an example of the frame image captured in step S2 after the AE process of step S6 and the prediction area 33 for optical measurement of the AE process in step S6.

FIG. 3B shows an example of the frame image captured in step S2 after execution of the AE process in step S6 and the prediction area 33 to constitute the object of the optical measurement area for the AE process in step S6.

As understood from FIG. 3B, the face 31 on the frame image 30 is located in the prediction area 33 intended for the AE process. Specifically, the area where the face is detected is not set as the optical measurement area as shown in FIG. 3A but the optical measurement area is displaced along the direction in which the face is positioned. Thus, the AE process is executed in advance on the assumption that the area where the face is considered to exist at the next image capture timing constitutes the optical measurement area. As a result, the image data of the face located at the capture timing can be captured with the proper exposure. Specifically, according to the prior art, as shown in FIG. 3A, the image capture is performed by executing the AE process with the detected face area 31 as an optical measurement area, and therefore, the face actually captured (the face area 31 in FIG. 3B) is different from the area where the AE process is executed (the face area 31 in FIG. 3A). The resulting inconvenience that the actually captured face is not exposed properly can be corrected according to this embodiment.

As described above, according to the first embodiment, a predetermined control operation for the image capture can be properly performed based on the angle of the detected face. For example, the face detection process is executed with weighting on a predetermined area based on the angle of the detected face, and therefore, the processing load of the tracking process can be reduced and the face can be tracked quickly. Also, in view of the fact that the AE process is executed by specifying the optical measurement area with weighting on the predetermined area based on the angle of the detected face, the image data can be captured with the proper exposure of the face area even in the case where the object moves. Further, the search movement of the focusing lens with weighting on the predetermined area based on the angle of the detected face makes possible the AF process quickly tracking the face.

Second Embodiment

Next, a second embodiment will be explained.
D. Operation of Digital Camera 1

The second embodiment also realizes the image capture device according to the invention using the digital camera 1 having a similar configuration to FIG. 1.

The operation of the digital camera 1 according to the second embodiment will be explained below with reference to the flowchart of FIG. 5.

Assume that the user fully depresses the video recording button of the key input unit 11 during the live-view display in image capture mode (with the arrival of the operation signal corresponding to the depression of the video recording button from the key input unit 11). The CPU 10, determining that the moving image capture operation is started, determines whether the image capture timing has arrived or not (step S21). In the case under consideration, the object is captured at the frame rate of 30 fps, and therefore, the image capture timing arrives at intervals of 1/30 second.

Upon determination in step S21 that the image capture timing has yet to arrive, the process stays in step S21 until the image capture timing arrives, and once the image capture timing arrives, the CPU 10 executes the image capture operation (step S22). This image capture operation is executed according to the exposure conditions (the shutter speed, aperture and the gain) set most recently in step S28 or S30. Specifically, the CCD 5 performs the exposure operation with the shutter speed and the aperture set, and the image data accumulated in the CCD 5 is read. The gain of the frame image read is automatically controlled in accordance with the set gain by the AGC of the unit circuit 8. The frame image of the brightness/color difference signal after automatic gain control which is generated by the image generation unit 15 is stored in the buffer.

Since the exposure conditions are not set in step S28 or S30 for the first frame capture (step S22) after starting the moving image capture operation, the AE process is executed based on the frame image captured most recently for the live-view display before the moving image capture operation, and the image capture operation is executed with the shutter speed, the diaphragm aperture and the gain thus set.

Next, the frame image captured most recently in step S2 and stored in the buffer is output by the CPU 10 to the face detection unit 23, which in turn is caused to execute the face detection process for the frame image captured most recently by the face detection unit 23 (step S23). The information indicating the face area detected by this face detection process and the information indicating the angle of the face are sent to the CPU 10. At the same time, the face detection process is executed under control of the control unit 101 of the CPU 10 in step S24 described later. It should be noted that the first face detection after starting the moving image capture operation is not controlled in step S24 described later, and therefore, covers the whole area, a predetermined area or an arbitrarily designated area of the frame image data.

Then, the control unit 101 of the CPU 10 controls the face detection unit 23 in such a manner as to execute the face detection process with emphasis placed on the angle of the detected face (step S24). This control operation is similar to step S4 of FIG. 2 explained above in the first embodiment.

Next, the CPU 10 executes the AF process with respect to the face based on the angle of the detected face (step S25). The AF process based on the angle of the detected face, like in step S7 of FIG. 2 in the first embodiment, is defined as the process in which the direction of the search movement of the focusing lens 2A is changed in accordance with the angle of the detected face.

Then, the CPU 10 causes the compression/expansion unit 20 to compress the frame image captured most recently in step S2 and stored in the buffer, and the frame image thus compressed is stored in the flash memory 22 through the DMA 21 (step S26).

Next, the CPU 10 determines whether the detected face has entered the prediction area 33 specified most recently in step S31 described later (step S27). According to this embodiment, the face detected to have entered at least one half of the prediction area 33 is regarded to have entered the specified prediction area 33. As an alternative, the face detected to have entered the prediction area 33 even slightly may be determined to have entered the specified prediction area 33. As another alternative, only the face detected to have entered the whole of the prediction area 33 may be determined to have entered the specified prediction area 33.

It should be noted that, in the case where the prediction area 33 is not specified in step S32 described later, on the other hand, the process branches to "N" in step S27. After the first image capture in step S22 from starting the moving image capture operation, the prediction area 33 is not yet specified, and therefore, the process branches to "N" in step S27.

Upon determination in step S27 that the detected face has entered the prediction area 33 specified most recently, the AE processing unit 102 of the CPU 10 sets the exposure conditions with the optical measurement area in the prediction area calculated most recently in step S33 described later (step S28) and the process moves to step S32. As a result, the image capture is performed under the exposure conditions based on the prediction area 33 set by the next operation in step S22.

Upon determination in step S27 that the detected face has yet to enter the prediction area 33 specified most recently, on the other hand, the CPU 10 determines whether the previous operation of step S30 has ended or not (step S29).

Upon determination in step S29 that the operation of the preceding step S30 has yet to end, the process moves to step S31, while upon determination in step S29 that the operation of the preceding step S30 has ended, on the other hand, the AE processing unit 102 of the CPU 10 sets the detected face area as an optical measurement area by calculating the exposure conditions (step S30), and the process moves to step S31. Specifically, the exposure conditions (aperture, shutter speed, gain) are set by the calculation based on the brightness signal of the image data in the detected face area of the frame image captured most recently. As a result, the image capture in the next step S22 is performed under the exposure conditions based on the set face area.

Once the process moves to step S31, the CPU 10 determines whether the angle of the detected face has changed or not. This determination is made based on whether the angle of the face detected most recently coincides with the angle of the preceding detected face to a degree not less than a predetermined value or not, and in the case of coincidence to a degree of not less than the predetermined value, the angle of the face is determined not to have changed.

In the case where the angle of the face is not detected before the detection of the face angle most recently such as in the case where the face angle is detected for the first time, for example, the face angle is determined to have changed.

Upon determination in step S31 that the face angle has yet to be changed, the process moves to step S34, while upon determination in step S31 that the face angle has changed, on the other hand, the prediction area 33 already specified cannot be maintained, i.e., the face is considered not to move in the direction toward the prediction area 33 set, and therefore, the process moves to step S32. It should be noted that, also in the case where the face angle is determined to have changed as the face angle is not detected before the detection most recently thereof, the prediction area is not specified, and therefore, the process moves to step S32.

Once the process moves to step S32, the AE processing unit 102 of the CPU 10 specifies the prediction area based on the face angle which is detected most recently in step S23. The prediction area based on this face angle is defined as a predetermined area with the detected face area displaced in the same direction as the face angle. This is by reason of the fact that the person is normally considered to move in the direction in which his/her face is oriented. The exposure conditions are calculated with emphasis placed on this specified prediction area.

Then, the AE processing unit 102 of the CPU 10 calculates the exposure conditions with emphasis placed on the specified prediction area 33 (step S33), and the process moves to step S34. Specifically, the specified prediction area 33 of the captured frame image most recently is set as an optical measurement area, and the exposure conditions (aperture, shutter speed, gain) are calculated based on the brightness signal of the image data in the optical measurement area.

Once the process moves to step S34, the CPU 10 determines whether the moving image capture operation is to be ended or not. This determination is made based on whether the operation signal corresponding to the fully pressed shutter button operation is sent again from the key input unit 11 or not.

In the case where step S34 determines that the moving image capture operation is ended, a moving image file is created based on the frame image recorded (step S35), while upon determination in step S34 that the moving image capture operation has yet to be ended, on the other hand, the process returns to step S21 to repeat the operation described above. Specifically, upon determination in step S21 that the image capture timing has arrived, the CCD 5 performs the exposure operation in step S22 with the shutter speed and the aperture set in step S28 or S30 thereby to read the frame image accumulated in the CCD 5. The gain of the frame image read from the CCD 5 is controlled automatically in accordance with the set gain by the AGC of the unit circuit 8. The frame image of the brightness/color difference signal after the automatic gain control, which is generated, by the image generation unit 15, is stored in the buffer.

Figure 6A:
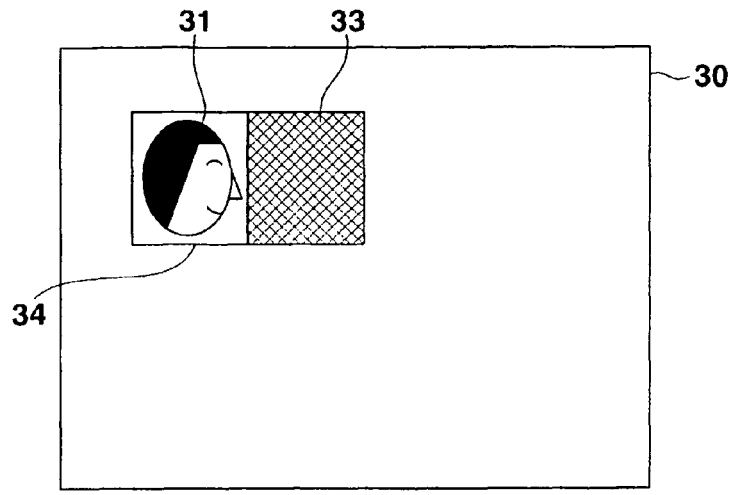
FIGS. 6A, 6B, and 6C are diagrams for explaining the exposure control according to the second embodiment.
Figure 6B:
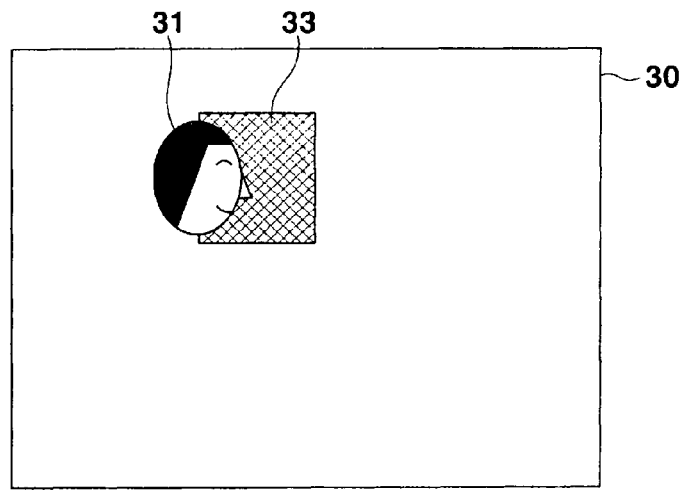
Figure 6C:
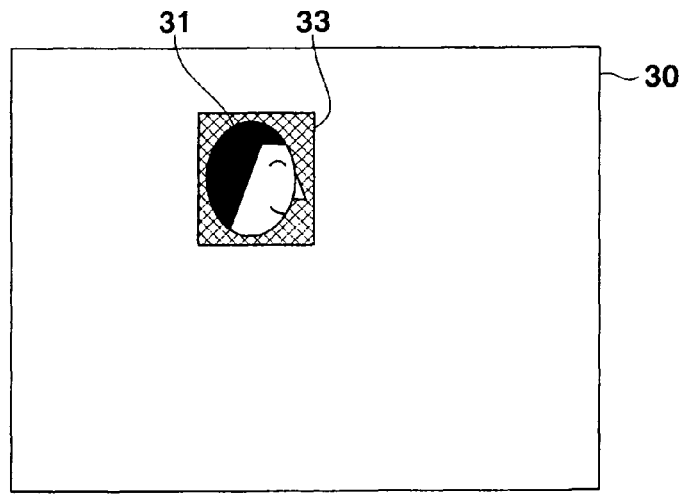

FIGS. 6A to 6C are diagrams for explaining the exposure control according to the second embodiment.

FIG. 6A shows the frame image 30 first captured after starting the moving image capture operation.

In FIG. 6A, the face 31 is the detected one, the area 34 represents the detected face area, and the area 33 the predicted area specified based on the angle of the detected face.

First, assume that the frame image is captured for the first time after starting the moving image capture operation. The process branches to "N" in step S27, the exposure conditions are calculated and set based on the detected face area 34 (the face area 34 shown in FIG. 6A) (step S30). Step S31 determines that the face angle is changed, and based on the angle of the detected face 31, the prediction area 33 as shown in FIG. 6A is specified (step S32) thereby to calculate the exposure conditions with the specified prediction area as an optical measurement area (step S33).

Upon determination in step S34 that the moving image capture operation is yet to be ended, step S22 performs the image capture under the exposure conditions calculated based on the face area of FIG. 6A.

FIG. 6B shows an example of the frame image captured in the process. In FIG. 6B, the prediction area 33 is the specified prediction area most recently, i.e., identical with the prediction area 33 shown in FIG. 6A.

As seen from FIG. 6B, at least one half of the detected face 31 has entered the prediction area 33, and therefore, step S27 determines that the face has entered the prediction area 33 thereby to set the exposure conditions based on the prediction area already calculated, i.e., the exposure conditions calculated based on the image data of the prediction area 33 shown in FIG. 6A (step S28).

Thus, the next frame image is captured under the exposure conditions based on the set prediction area 33.

FIG. 6C is a diagram showing an example of the frame image captured in the process.

From FIG. 6C, it can be understood that the face 31 on the frame image 30 is located on the prediction area 33. Specifically, upon determination that the face 31 has entered the prediction area 33, the image capture is performed under the exposure conditions calculated in advance based on the prediction area 33, and therefore, the image data of the face located at the capture timing can be captured with the proper exposure.

As described above, once the face 31 enters the specified prediction area 33, the image capture is performed under the exposure conditions calculated in advance based on the specified prediction area 33, and therefore, the image capture for a moving image can be performed quickly and properly even if the object moves. If the image capture operation is executed by the AE process with the detected face area as an optical measurement area as shown in FIG. 6A, a considerable time would be consumed by the AE process, with the result that the face is already moved and the actually captured face could not be exposed properly in the next capturing sequence. According to this embodiment, this inconvenience can be corrected.

Also, since the image capture is performed after entry of the object into the prediction area 33 under the exposure conditions calculated in advance, the proper image capture operation can be executed even in the case where the face of the object is directed sideways but not in motion. In addition, even in the case where the upper half part of the object first begins to move from the stationary state, the direction of movement can be predicted from the face angle of the object. Thus, the face of the object can be captured quickly and properly even if the object moves.

As described above, according to the second embodiment, the predetermined control operation can be properly carried out for the image capture based on the angle of the detected face. For example, the prediction area 33 is specified based on the angle of the detected face, and the exposure conditions are calculated with the specified prediction area 33 as an optical measurement area. Until the face enters the specified prediction area 33, the exposure is controlled based on the detected face area, while once the face enters the specified prediction area 33, the image capture is performed under the exposure conditions based on the calculated prediction area. In this way, the image data with the face area exposed properly can be captured, so that the proper image capture operation can always be executed regardless of whether the object is moving or stationary. Also in the case where the object begins to move from the stationary state, the proper image capture operation can be executed effectively by tracking the object quickly.

Further, since the focusing lens is moved for search with emphasis placed on the angle of the detected face, the AF process can be executed by quickly tracking the face.

[First Modification]

The first and second embodiments described above can be modified as follows:

(1) In the first and second embodiments described above, the prediction area 33 is specified based on the angle of the detected face, and the AE process is executed and the exposure conditions calculated with the specified prediction area 33 as an optical measurement area. Regardless of the angle of the detected face, however, the AE process may be executed and the exposure conditions calculated with emphasis placed on the prediction area 33 based on the angle of the detected face by determining the whole area of the image data as an optical measurement area. Specifically, the AE process may be executed and the exposure conditions calculated by weighting the brightness component of the image data in the area displaced along the angle of the detected face.

This will be explained with reference to FIG. 3A. The AE process is executed with the whole area of the image data 30 determined as an optical measurement area while at the same time weighting the predetermined area 33. Also, referring to FIG. 6A, the exposure conditions are calculated with the whole area of the image data 30 determined as an optical measurement area while at the same time by weighting the predetermined area 33.

In short, the AE process may be executed and the exposure conditions calculated with emphasis placed on a predetermined area based on the angle of the detected face.

(2) In the first and second embodiments described above, the amount of face movement may be detected, and based on this detected degree of movement, the length, in the face direction, of the predetermined area 32 to be detected or the size of the predetermined area 32 may be changed in accordance with the detected degree of movement.

This will be explained with reference to FIGS. 3A and 3B. In accordance with the detected degree of movement of the face 31, the length of the predetermined area 32 in the angle of the detected face is changed.

This is by reason of the fact that in the case where the degree of movement of the face 31 is small, a slight increase in the length in the angle of the detected face or a slightly increase in the size of the predetermined area 32 to be detected would only result in a more wasteful process. In the case where the degree of movement of the face 31 is large, on the other hand, a slight decrease in the length of the predetermined area 32 in the angle of the detected face or a slight decrease in the size of the predetermined area 32 would make it sometimes impossible to detect the face 31. By the aforementioned method, therefore, the face can be quickly detected while at the same time reducing the processing load of the face detection.

The degree of movement of the face may be detected alternatively based on the face position detected by the face detection process or by detecting the vector of face movement using the block matching scheme or the like.

Also, taking both the angle and the degree of movement of the face 31 into consideration, both the length in the direction of the face angle in the predetermined area 32 and the size of the predetermined area may be changed.

It should be noted that the predetermined area 32 such as the prediction area 33 may be displaced from the face area in the angle of the detected face. In this case, the length by which the predetermined area 32 is displaced from the detected face area in the direction of the face angle is changed based on the detected degree of movement.

(3) In the first and second embodiments described above, the degree of movement of the detected face is detected, and based on the detected degree of movement, the length by which the specified optical measurement area 33 is displaced from the detected face area in the direction of the face angle may be changed.

Referring to FIG. 3A, the length by which the specified prediction area 33 is displaced is changed in accordance with the detected degree of movement of the face 31. Specifically, in the case where the degree of movement is large, the displacement amount is correspondingly increased, and vice versa.

As a result, the area where the face 31 is considered to be located at the image capture timing can be specified as the prediction area 33 based on the degree of movement of the detected face 31, so that the image data can be captured with the proper exposure of the face area located at the time of the image capture.

The face degree of movement may alternatively be detected based on the face position detected in the past by face detection process, or by detecting the vector of face movement using the block matching scheme or the like.

It should be noted that the size of the specified prediction area 33 may be changed based on the detected degree of movement. Also in this way, the area where the face 31 is considered located at the image capture timing can be specified as the prediction area 33 based on the detected degree of movement of the face 31, so that the image data can be captured with the face area properly located and properly exposed at the time of the image capture.

(4) In the first and second embodiments described above, the face detection unit 23 executes the face detection process with emphasis placed on the angle of the detected face in such a manner that an area having the predetermined feature data of the object coincident, to a degree not less than a predetermined value, with those of the predetermined 32 extended in the angle of the detected face. As an alternative, the face detection may be effected over the whole area, and the predetermined value for face detection in other than the predetermined area 32 extended in the angle of the detected face may be increased beyond the predetermined value for the predetermined area. As another alternative, the face detection may be effected over the whole area, and the predetermined value for face detection in other than the predetermined area 32 extended in the angle of the detected face may be decreased below the predetermined value for the predetermined area.

Also, the feature data of the object retrieved in a predetermined area may be greater in number than those of the areas other than the predetermined area.

Further, the feature data are retrieved first in the predetermined area, and in the case where the features data of no area in the predetermined area are coincident to a degree riot less than the predetermined value, then the feature data may be retrieved in other than the predetermined area.

As a result, the face in the areas of a predetermined range extended in the angle of the detected face can be detected more easily.

(5) The first and second embodiments have been explained above with reference to the moving image capture operation. Nevertheless, the invention may be applicable also to the live-view display in moving image capture mode or still image capture mode.

Specifically, in the application to the live-view display according to the first embodiment, the operation of step S8 is not performed after the operation of step S7 in FIG. 2 and moves to step S9 to determine whether the moving image capture operation or the still image capture operation is executed or not. Upon determination that neither is executed, the process returns to step S1. In the case where step S8 determines that the moving image capture operation or the still image capture operation is executed, then the capture operation starts. Also, according to the second embodiment, the operation of step S26 is not performed and the process directly moves to step S27 after the operation of step S25 in FIG. 5. Then, step S34 determines whether the moving image capture operation or the still image capture operation is executed or not. In the case where the determination is negative, the process returns to step S21.

Figure 5:
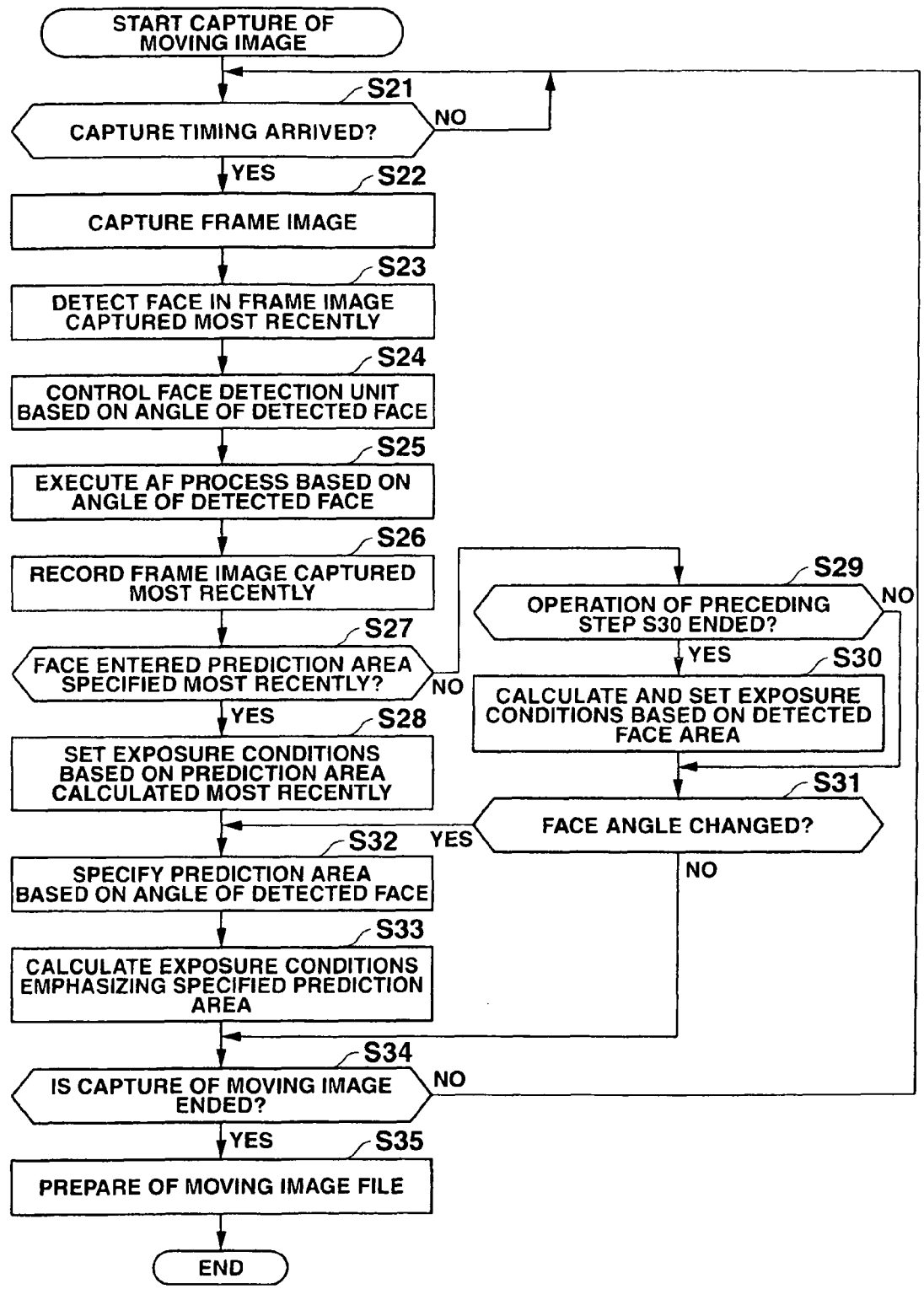
FIG. 5 is a flowchart showing the operation of the digital camera 1 according to a second embodiment.

In this case, the still image capture operation may alternatively be executed in such a manner that the exposure conditions determined for the face area or the prediction area 33 specified most recently in step S5 in FIG. 2 or S28 or S30 in FIG. 5 may be replaced with the exposure conditions for the still image capture operation.

Also, the image of the face detected immediately before the still image capture operation may be automatically focused.

(6) In the first and second embodiments described above, the length of the predetermined area 32 to be detected, along the angle of the face, or the size of the predetermined area 32 may be changed in accordance with the angle of the detected face.

Also, the amount by which the specified prediction area 33 is displaced in the direction of the face angle from the detected face area may be changed in accordance with the angle of the detected face.

Even in the case where the face is moving at the same speed, for example, the distance covered between the captured image data by the face becomes longest in the case where the face is directed just sideways, and shortened in the case where the face is directed diagonally toward this side or diagonally rearward. The distance covered by the face between the image data becomes shortest in the case where the face is directed ahead or behind.

As a result, the image data can be captured properly with the proper exposure with the face area properly exposed at the time of the image capture. Also, the face can be detected quickly while at the same time reducing the processing load of the face detection.

It should be noted that the predetermined area 32, like the prediction area 33, may be displaced from the face area in the angle of the detected face. In this case, the amount by which the predetermined area 32 is displaced from the detected face area in the angle of the detected face is changed based on the angle of the detected face. Also, the size of the specified predicted area 33 may be changed based on the detected degree of movement. This also improves the effect described above.

(7) An automatic switching means may be employed whereby in the case where the object is moving at a lower than a predetermined speed, the exposure is controlled in the same manner as in the second embodiment, while once the moving speed of the object exceeds a predetermined speed, the exposure is controlled in the same manner as in the first embodiment. The moving speed of the object may be detected based on the face position detected in the past by the face detection process or by detecting the face motion vector using the block matching scheme or the like.

(8) In the first and second embodiments described above, the face is tracked by the face detection process executed by the face detection unit 23. In place of this method, the block matching or the like method may be employed to track the face detected by the face detection unit 23. Specifically, a particular point in the frame image captured later where the image data of the detected face area exists is detected by the block matching scheme thereby to track the detected face.

Also in this process, the face tracking operation is performed with emphasis placed on the angle of the face detected by the face detection unit 23. In other words, the detected face retrieval range is changed based on the angle of the detected face.

In the case where the frame image is captured as shown in FIG. 3A, for example, the detected face is the one designated by numeral 31, and therefore, the retrieval range covers not the whole area of the frame image 30 but the prediction area 33. Specifically, a particular point where the image data of the detected area of the face 31 is located in the prediction area 33 of the subsequently captured frame image 30 is detected thereby to track the detected face. In this way, the face can be tracked quickly.

In this case, the face can be tracked but the angle of the tracked face is unknown. Thus, the face detection unit 23 detects the face in the face area tracked thereby to detect the angle of the tracked face. In this case, the face is detected in the face area tracked, and therefore, the processing load of the face detection can be reduced, thereby making it possible to detect the face quickly.

It should be noted that the face tracking operation according to the block matching scheme is also performed by face area detection, and therefore, considered a kind of the face detection process. This method is different from the face detection by the face detection unit 23, however, in that the face detection unit 23 detects the face by comparison and collation with the face feature data recorded in advance, whereas according to the block matching scheme, the face is detected by comparing and collating the image data in the captured face area with the frame image subsequently captured.

(9) In the second embodiment described above, the prediction area into which the object is considered to move is specified, and in the case where the object enters the specified prediction area, the image capture is controlled under appropriate conditions within the prediction area calculated in advance. As an alternative, upon determination whether the object has moved or not and that the object has moved in the predicted direction, the image capture may be controlled under the conditions calculated in advance. Specifically, the moving direction is predicted and the prediction area to which the object is considered to move are specified based on the face angle, and upon determination that the face has moved in the predicted direction, the image capture is controlled under appropriate conditions in the prediction area calculated in advance.

In this case, the next image capture after detection of the object movement is controlled under appropriate conditions in the specified prediction area. Therefore, the problem is obviated that even though the entry of the object into the prediction area is detected, no object exists in the prediction area in the next capturing sequence due to the high moving speed of the object.

(10) In the first and second embodiments described above, the human face is detected. Instead of the human face, however, a predetermined object such as the face or the whole body (including the head, torso, arms and legs) of an animal such as a cat or a dog may be detected. Also in this case, the angle of a predetermined object is detected.

(11) In the first and second embodiments described above, the area where the face is to be detected is set in the predetermined area 32 and the area where the exposure is to be controlled in the prediction area 33. As an alternative, the same area may be defined for both the face detection and the exposure control. Specifically, the face may be detected and the exposure controlled either in the predetermined 32 or in the prediction area 33.

(12) Also, any of the modifications (1) to (11) described above may be combined appropriately in a manner free of conflict.

Third Embodiment

Next, the third embodiment will be explained.
E. Operation of Digital Camera 1

Also in the third embodiment, the image capture device according to the invention is realized using the digital camera 1 having a similar configuration to the one shown in FIG. 1. It should be noted that the CPU 10 has an intended area detection unit for detecting an intended area based on the angle of each face detected.

The operation of the digital camera 1 according to the third embodiment will be explained below with reference to the flowchart of FIG. 7.

The user operates the mode switching key of the key input unit 11 to set the apparatus in still image capture mode. Then, the CPU 10 causes the CCD 5 to start capture the object at a predetermined frame rate and starts what is called the liveview display process in which the frame image of the brightness/color difference signal sequentially generated by the image generation unit 15 and stored in the buffer (DRAM 13) are displayed on the display unit 18 (step S51).

Then, the CPU 10 determines whether the user has half pressed the shutter button or not (step S52). This determination is based on whether the operation signal corresponding to the half press operation of the shutter button has been sent from the key input unit 11 or not.

Upon determination in step S52 that the shutter button is not half pressed, the process stays in step S52 until the shutter button is half pressed. Once the shutter button is determined to have been half pressed, the CPU 10 outputs the frame image captured most recently and stored in the buffer to the face detection unit 23, which is thus caused to execute the face detection process on the frame image captured most recently (step S53). The information indicating the face area detected by this face detection process and the information indicating the angle of the detected face are sent to the CPU 10.

Next, the CPU 10 determines whether a plurality of faces are detected by the face detection process or not (step S54).

Upon determination in step S54 that a plurality of faces are detected, the intended area detection unit of the CPU 10 detects the intended area based on the angle of each detected face (step S55). The intended area is defined as an area viewed (closely watched) by the person of which the face is detected.

In this intended area detection process, an area where the extensions of the directions of the angle of the detected faces cross each other.

Figure 8:
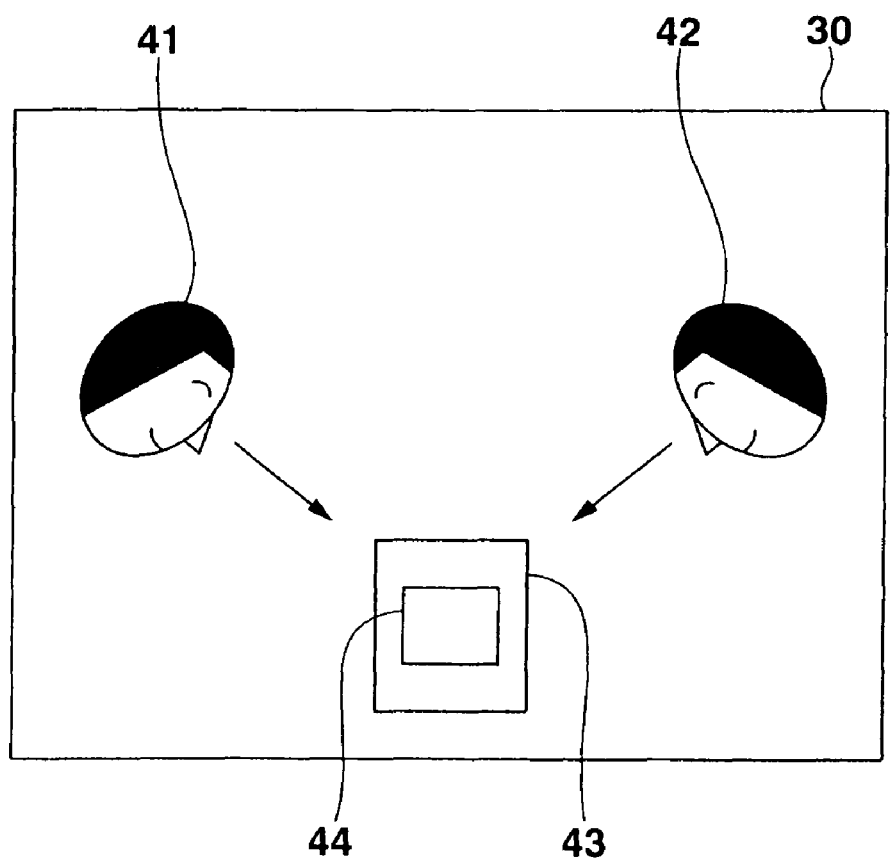
FIG. 8 is a diagram showing an example of the state of a watched area 44 detected based on the angle of the detected face.

FIG. 8 is a diagram showing an example of the state of the intended area detected based on the angle of the detected faces.

From FIG. 8, it can be understood that the faces 41 and 42 are watching the object 43, and therefore, the object closely watched (intended object) is the object 43.

In the case under consideration, the faces 41 and 42 are detected, and a predetermined area having the center at a point where the extensions of the directions of the angles of the detected faces cross each other forms the intended area 44.

Returning to the flowchart of FIG. 8, upon detection of the intended area, the CPU 10 determines whether the intended area 44 is detected by an intended area detector or not (step S56).

Upon determination in step S56 that the intended area 44 is detected, the AE processing unit 102 of the CPU 10 sets the detected intended area 44 as an optical measurement area, and based on the brightness component of the image data of the optical measurement area, executes the AE process for the still image. At the same time, the CPU 10 executes the AF process for the intended area (step S57), and then advances to step S59. As the result of the AF process, the focusing lens 2A is moved to the focused lens position based on the highfrequency component of the image data in the intended area. In the process, the information indicating the intended area (an intended frame, for example) may be displayed on the through image.

Upon determination in step S54 that a plurality of faces are not detected and in step S56 that the intended area 44 cannot be detected, on the other hand, the AE processing unit 102 of the CPU 10 sets the detected face area as an optical measurement area, and based on the brightness component of the image data of the optical measurement area, executes the AE process for the still image. At the same time, the AF processing unit of the CPU 10 executes the AF process for the intended area (step S58) and then the process moves to step S59. As the result of the AF process, the focusing lens 2A is moved to the focused lens position based on the high-frequency component of the image data in the detected face area.

In the process, in the presence of a plurality of faces detected, the AE process may be executed based on all or any one of the face areas. Also, in the presence of a plurality of faces detected, the AF process may be executed to focus on all or any one of the detected faces.

After moving to step S59, the CPU 10 determines whether the shutter button has been fully pressed by the user or not.

Upon determination in step S59 that the shutter button is not fully pressed, the process stays in step S59 until the shutter button is fully pressed, and upon determination that the shutter button is fully pressed, the CPU 10 executes the still image capture operation under the exposure conditions set by the AE process in step S57 or S58, so that the image frame of the brightness/color difference signal generated by the image generation unit 15 and compressed by the compression/expansion unit 20 is recorded in the flash memory 22 through the DMA 21 (step S60).

As described above, according to the third embodiment, a predetermined control operation for the image capture can be appropriately carried out based on the angle of the detected face. In the case where a plurality of faces are detected, for example, an area where the extensions along the directions of the respective detected face angles cross each other is detected as the intended area 44 closely watched by the persons to be captured, and the AE and AF processes are executed on the intended area 44 thus detected. Thus, the exposure of the object closely watched can be controlled properly and the image can be focused properly.

[Second Modification]

The third embodiment described above may be modified as described below.

(3-1) In the third embodiment described above, upon determination in step S59 in FIG. 7 that the shutter button is not fully pressed, the process stays in step S59 until the shutter button is fully pressed. As an alternative, upon determination in step S59 that the shutter button is not fully pressed, the process may return to step S53. In other words, the continuous AF process may be executed in which the intended area and the face are tracked until the shutter button is fully pressed.

Also, this embodiment, though described above with reference to the still image capture operation, is applicable also to the moving image capture operation.

(3-2) Although an area where the extensions along the directions of the angle of the detected faces cross each other is detected as an intended area according to the third embodiment described above, an area where the extensions of a part (at least two) of the angle of the detected faces cross each other may be detected as an intended area.

(3-3) In the third embodiment described above, the AE process is executed with the detected intended area or the detected face area as an optical measurement area. Nevertheless, the AE process may be executed by regarding the whole area of the captured image data as an optical measurement area and by weighting at least the intended areas detected.

(3-4) Although the face of a person is detected in the third embodiment described above, the face of an animal such as a cat or a dog or the whole body of the person (including the head, torso, arms and legs) may alternatively be detected as a predetermined object. Also in this case, the angle of the predetermined object is detected.

(3-5) Unlike in the third embodiment representing the case of the still image capture operation, the invention is applicable also to the moving image capture operation. In other words, the AE and AF processes may be executed periodically for the intended area 44 detected during the moving image capture operation.

(3-6) Also, any of the modifications (3-1) to (3-5) described above may be combined without any conflict.

Also, according to each embodiment described above, the face detection unit 23 detects both the face and the angle of the detected face. Instead, the face detection unit 23 may detect the face while other means may detect the angle of the detected face.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means. The embodiments have been described above with reference to a case in which the image capture device according to the invention is used for the digital camera. The invention, however, is not limited to these embodiments, but applicable with equal effect to any device which can capture an image of an object.

What is claimed is:

1. An image capture device comprising:
  a capture unit which captures an image;
  an area detection unit which detects a current area of a predetermined object in the image captured by the capture unit, wherein the current area is only a part of the image captured by the capture unit and contains the predetermined object;
  an angle detection unit which detects an orientation direction of the predetermined object detected by the area detection unit;
  a specifying unit which specifies a prediction area based on the current area detected by the area detection unit and the orientation direction of the predetermined object detected by the angle detection unit, wherein the prediction area is a part of the image captured by the capture unit which does not contain the predetermined object; and
  a control unit which performs a predetermined control operation for the image capture device based on the prediction area specified by the specifying unit.

2. The image capture device according to claim 1, wherein the predetermined control operation comprises at least one of an exposure control operation and a control operation for the prediction area specified by the specifying unit.

3. The image capture device according to claim 2, wherein the control unit calculates an exposure condition for the prediction area and performs an exposure control based on the calculated exposure condition.

4. The image capture device according to claim 3, wherein the control unit performs the exposure control based on the calculated exposure condition when the object is located within the prediction area.

5. The image capture device according to claim 2, wherein the control unit calculates an exposure condition for a whole area of the image captured by the image capture device and performs an exposure control based on the exposure condition with weighting on the prediction area.

6. The image capture device according to claim 1, wherein a position of the prediction area is apart from a position of the current area detected by the area detection unit by a distance that is based on the orientation direction of the object detected by the angle detection unit.

7. The image capture device according to claim 1, further comprising:
  a moving distance detection unit which detects a moving distance of the object,
  wherein the prediction area is at a position apart from a position of the current area detected by the area detection unit, the positions being apart by a distance corresponding to the moving distance detected by the moving distance detection unit.

8. The image capture device according to claim 1, wherein the prediction area has a size that is based on the orientation direction of the object detected by the angle detection unit.

9. The image capture device according to claim 1, further comprising:
  a moving distance detection unit which detects a moving distance of the object,
  wherein the prediction area has a size that is based on the moving distance detected by the moving distance detection unit.

10. The image capture device according to claim 1, wherein the control unit controls an area detection operation which is performed next by the area detection unit with weighting on the prediction area.

11. The image capture device according to claim 10, wherein the control unit controls the area detection unit such that the area detection unit detects a face within the prediction area.

12. The image capture device according to claim 10, wherein the area detection unit determines whether an area coincides with feature data of a predetermined face to determine a coincidence level of the area, and detects the area as being a face when the coincidence level is more than a predetermined level; and
  wherein the control unit controls the area detection operation which is performed next by the area detection unit based on the orientation direction of the object detected by the angle detection unit such that the predetermined level for an area outside the prediction area is higher than the predetermined level for the prediction area.

13. The image capture device according to claim 1, wherein the specifying unit specifies an area in which the predetermined object is to be located, as the prediction area.

14. A non-transitory computer readable storage medium having a computer program stored thereon that controls an image capture apparatus to perform functions as:
  a capture unit which captures an image;
  an area detection unit which detects a current area of a predetermined object in the image captured by the capture unit, wherein the current part is only a part of the image captured by the capture unit and contains the predetermined object;
  an angle detection unit which detects an orientation direction of the predetermined object detected by the area detection unit;
  a specifying unit which specifies a prediction area based on the current area detected by the area detection unit and the orientation direction of the object detected by the angle detection unit, wherein the prediction area is a part of the image captured by the capture unit which does not contain the predetermined object; and
  a control unit which performs a predetermined control operation for the image capture device based on the prediction area specified by the specifying unit.

15. The non-transitory computer readable storage medium according to claim 14, wherein the specifying unit specifies an area in which the predetermined object is to be located, as the prediction area.

* * * * *